US012807234B2

(12) United States Patent
Cha

(10) Patent No.: US 12,807,234 B2

(45) Date of Patent: Nov. 24, 2026

(54) VEHICLE BODY

(71) Applicants: Hyundai Motor Company, Seoul (KR); Kia Corporation, Seoul (KR)

(72) Inventor: Hyo Seop Cha, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 365 days.

(21) Appl. No.: 18/609,236

(22) Filed: Mar. 19, 2024

(65) Prior Publication Data

US 2025/0187671 A1 Jun. 12, 2025

(30) Foreign Application Priority Data

Dec. 7, 2023 (KR) ........................ 10-2023-0176914

(51) Int. Cl.

*B62D 25/02* (2006.01)
*B60J 5/06* (2006.01)
*B62D 21/03* (2006.01)
*B62D 27/02* (2006.01)

(52) U.S. Cl.

CPC .............. *B62D 25/025* (2013.01); *B60J 5/06* (2013.01); *B62D 21/03* (2013.01); *B62D 27/023* (2013.01)

(58) Field of Classification Search

CPC .......... B60J 5/06; B62D 21/03; B62D 27/023; B62D 25/056; B62D 25/20

See application file for complete search history.

(56) References Cited

U.S. PATENT DOCUMENTS

| | | | | |
|---|---|---|---|---|
| 9,884,659 | B2 | 2/2018 | Onishi | |
| 2012/0119546 | A1* | 5/2012 | Honda | B62D 25/00 296/203.01 |
| 2014/0333092 | A1* | 11/2014 | Mori | B62D 25/20 |
| 2020/0223490 | A1 | 7/2020 | Min et al. | |
| 2022/0032757 | A1* | 2/2022 | An | B60J 5/0477 |
| 2022/0289005 | A1* | 9/2022 | Saiki | E05D 15/101 |

FOREIGN PATENT DOCUMENTS

| | | | | | |
|---|---|---|---|---|---|
| DE | 102018124174 | A1 | * | 4/2019 | B62D 25/20 |
| EP | 2060474 | A1 | * | 5/2009 | B62D 25/20 |
| JP | 2003054447 | A | | 2/2003 | |
| JP | 2003237369 | A | | 8/2003 | |
| JP | 5696883 | B2 | * | 4/2015 | B62D 25/20 |
| JP | 2019116151 | A | * | 7/2019 | B62D 25/02 |
| JP | 2021113007 | A | * | 8/2021 | B62D 21/15 |
| JP | 2021160506 | A | * | 10/2021 | B62D 25/20 |
| KR | 20200088141 | A | | 7/2020 | |

* cited by examiner

*Primary Examiner* — Carly W. Lynch

(74) *Attorney, Agent, or Firm* — Slater Matsil, LLP

(57) ABSTRACT

A vehicle body may include first and second side sills, wherein the first side sill has a first entry hole configured to allow a first rail unit for a first sliding door to enter a first inner side of the vehicle body, and a reinforcing structure including a first rail reinforcement protruding inward relative to the first side sill, the first rail reinforcement being shaped and configured to block the first rail unit at the first inner side of the vehicle body adjacent to the first entry hole, and the reinforcing structure including members crossing the vehicle body from side to side in front of and behind the first entry hole, wherein the first rail reinforcement is connected to the members, and wherein the reinforcing structure is configured to reinforce a first side surface of the vehicle body.

20 Claims, 9 Drawing Sheets

VEHICLE BODY

CROSS-REFERENCE TO RELATED APPLICATIONS

This application is based on and claims priority under 35 U.S.C. 119 to Korean Patent Application No. 10-2023-0176914, filed on Dec. 7, 2023, in the Korean Intellectual Property Office, the disclosure of which is herein incorporated by reference in its entirety.

TECHNICAL FIELD

The present disclosure relates to a vehicle body.

BACKGROUND

In the case of purpose-built vehicles (PBVs), the low step height and flat floor design make passenger boarding convenient.

In addition, double-door-type sliding doors are applied to provide passengers with an automatic door opening and closing function and a wide entrance, which further contribute to passenger convenience.

When applying double-door-type sliding doors to a vehicle, a B-pillar is removed.

In addition, along with a rail part, a door latch part enters a center floor, and a side sill inner has a hole into which the rail part enters.

However, due to the removal the B-pillar and the formation of the hole for the entry of the rail part in the middle of the side sill, the lateral stiffness of the vehicle body may be reduced.

The information described in this Background section is intended merely to aid in the understanding of the background of the present disclosure, and should not be taken as an acknowledgement or any form of suggestion that this information forms the prior art already publicly known, available, or in use.

SUMMARY

The present disclosure relates to a vehicle body wherein a reinforcing material is connected to a side sill to improve the lateral stiffness of the vehicle body, thereby improving collision performance.

An embodiment of the present disclosure provides a vehicle body wherein a reinforcing material is connected to a side sill to improve the lateral stiffness of the vehicle body, thereby improving collision performance.

To achieve the above advantages, a vehicle body according to an embodiment of the present disclosure may include side sills, each of which has an entry hole formed to allow a rail unit for sliding of a sliding door to enter an inner side of a vehicle, a rail reinforcement shaped to block the rail unit at an inner side of the entry hole, and a reinforcing structure in which the rail reinforcement is connected to members crossing the vehicle body from side to side in front of and behind the entry hole to reinforce a side surface of the vehicle body.

A space into which the rail unit enters may be formed between the rail reinforcement and the entry hole, and both ends of the rail reinforcement may be fixed to an inner surface of the side sill.

The reinforcing structure may be formed in a rectangular shape between left and right side sills.

The reinforcing structure may include crossmembers connected between the left and right side sills at front and rear sides of the rail reinforcement, respectively, and crossmember extensions formed from the crossmembers toward the rail reinforcement and fixed to inner surfaces of the side sills.

The crossmember extensions may be connected to the rail reinforcement.

Multiple crossmembers may be connected to each of the front and rear sides of the rail reinforcement, and the crossmember extensions may be longitudinally connected to the multiple crossmembers.

A side sill reinforcement may be fixed to each of the side sills, and the crossmember extensions may have welding holes formed to weld the side sill reinforcement to the side sill.

The side sill reinforcement, the crossmember extensions, and the rail reinforcement may be welded along a welding line formed in a longitudinal direction of the side sill.

A side sill reinforcement having a corrugated cross-section and formed at each of both ends of the entry hole may be fixed to each of the side sills.

In the corrugated cross-section of the side sill reinforcement, an upper convex portion may be formed to have a larger cross-section than a lower convex portion.

In the corrugated cross-section of the side sill reinforcement, the upper convex portion may be formed to have a cross-section protruding further outward from the vehicle body than that of the lower convex portion.

The entry hole may be formed in a part of a vertical section of a sidewall of each of the side sills, and a connecting reinforcement may be fixed in the remaining section of the sidewall of the side sill, in which the entry hole is not formed.

The connecting reinforcement may be formed in the longitudinal direction of the side sill and connected to the side sill reinforcement.

Connection portions of the connecting reinforcement and the side sill reinforcement may be shaped to have cross-sections matching each other.

A support reinforcement may be connected between the rail reinforcement and the crossmembers.

A front end and a rear end of the support reinforcement may be connected to a front crossmember and a rear crossmember, respectively, and a side end of the support reinforcement may be connected to an inner side of the rail reinforcement.

The support reinforcement may be formed to have a height corresponding to that of the rail unit which has entered the entry hole.

An embodiment of the present disclosure can provide for enhancing the collision performance of a vehicle by preventing the rail unit located in the entry hole from being pushed into the vehicle by using the rail reinforcement in the event of a side collision of the vehicle.

Furthermore, an embodiment of the present disclosure is advantageous in that the rail reinforcement is connected to the crossmembers to reinforce the stiffness of the side sill, thereby improving the stiffness of the vehicle body to improve noise, vibration, and harshness (NVH) performance in addition to the collision performance.

BRIEF DESCRIPTION OF THE DRAWINGS

The above and other features and advantages of the present disclosure can be more apparent from the following detailed description taken in conjunction with the accompanying drawings, in which.

DETAILED DESCRIPTION OF ILLUSTRATIVE EMBODIMENTS

Figure 1:
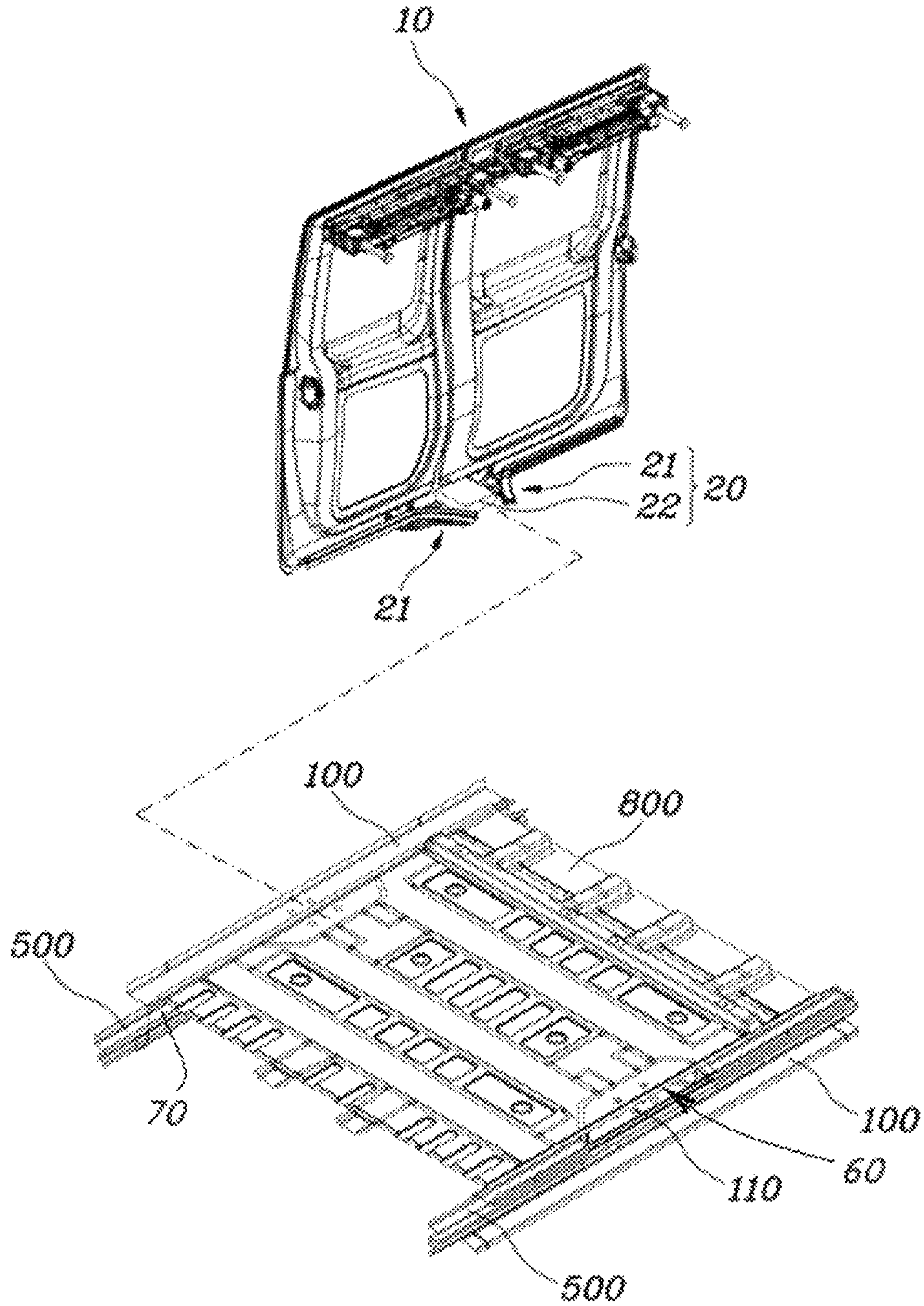
FIG. 1 is an exploded perspective view that illustrates a state in which a sliding door according to the present disclosure is separated from a center floor according to an embodiment of the present disclosure.

Hereinafter, embodiments disclosed in the present specification will be described in detail with reference to the accompanying drawings, and same or similar elements can be given same and similar reference numerals, so duplicate descriptions thereof can be omitted.

The terms "module" and "unit" used for elements in the following description can be given or interchangeably used in consideration of only the ease of writing the specification, and do not necessarily have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not necessarily limited to the accompanying drawings, and it can be understood that changes, equivalents, or substitutes thereof can be included in the spirit and scope of the present disclosure.

Terms including an ordinal number such as "first," "second," or the like may be used to describe various elements, but the elements are not necessarily limited to the terms. Such terms can be used merely for the purpose of distinguishing one element from another element.

In the case where an element is referred to as being "connected" or "coupled" to any other element, it can be understood that another element may be provided therebetween, as well as that the element may be directly connected or coupled to the other element. In contrast, in the case where an element is "directly connected" or "directly coupled" to any other element, it can be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Hereinafter, example embodiments of the present disclosure will be described in detail with reference to the accompanying drawings.

A vehicle body according to an embodiment of the present disclosure includes side sills 100 each having an entry hole 110 formed to allow a rail unit 20 for sliding of each of sliding doors 10 to enter the inner side of a vehicle, a rail reinforcement 200 shaped to block the rail unit 20 at the inner side of the entry hole 110, and a reinforcing structure 50 in which the rail reinforcement 200 is connected to members crossing the vehicle body from side to side in front of and behind the entry hole 110 to reinforce a side surface of the vehicle body.

Figure 2:
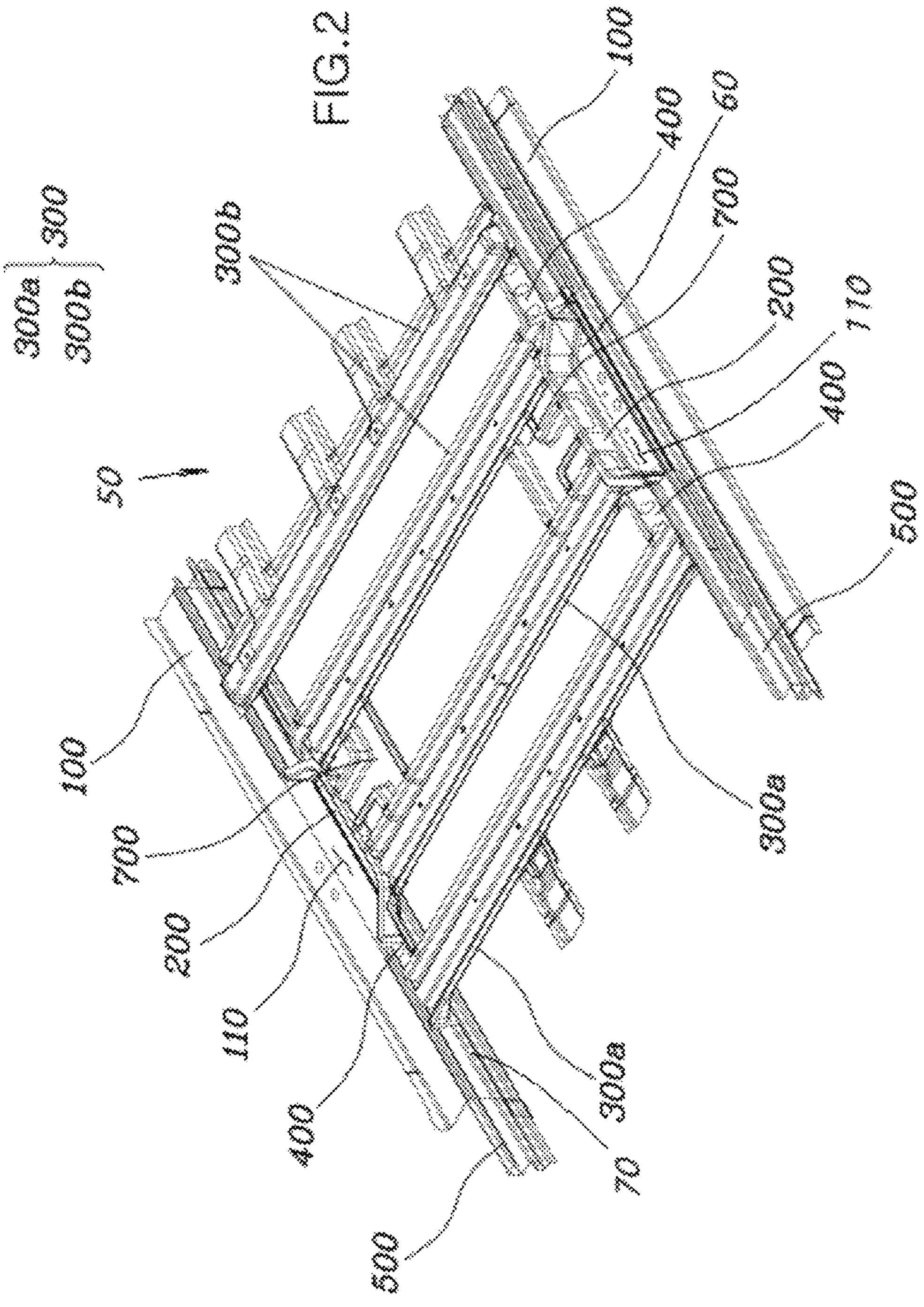
FIG. 2 is a perspective view that illustrates a center floor from which a floor panel has been removed according to an embodiment of the present disclosure.

Referring to FIGS. 1 and 2, a center floor can be provided at a mid-lower portion of a vehicle, and a floor panel 800 can cover the top of the center floor to form the bottom surface of the vehicle.

On each of the left and right sides of the center floor, a side sill inner (hereinafter, referred to as "side sill") can be provided, and a seat crossmember 300 (hereinafter, referred to as "crossmember") can be connected between the left and right side sills 100, and multiple crossmembers 300 can be connected to the front and rear sides of the center floor.

Furthermore, a passage-shaped entry hole 110 can be formed in the middle portion of each of the left and right side sills 100 along the front/rear longitudinal direction of each side sill 100.

Furthermore, a double-door-type sliding door 10 can be installed on each of the left and right sides of the vehicle in the forward/rearward direction, and a door latch part 22 for opening and closing operations of the door can be installed at the bottom of a sliding door 10 along with a rail part 21 forming a sliding path.

The end of the rail part 21 can be formed in a shape bent toward the side sill 100 and can be structured to enter the entry hole 110 together with the door latch part 22.

Accordingly, on the inner side of the entry hole 110, a rail reinforcement 200 can be positioned at a certain distance from the entry hole 110, and the rail reinforcement 200 can be shaped to block the entry hole 110.

A reinforcing structure 50 can be formed by connecting the front end of the rail reinforcement 200 to the crossmember 300 positioned in front of the entry hole 110 and connecting the rear end of the rail reinforcement 200 to the crossmember 300 positioned behind the entry hole 110.

Thus, in the event of a side collision of the vehicle, the rail reinforcement 200 may block a rail unit 20 located in the entry hole 110 from being pushed into the vehicle, thereby improving the collision performance of the vehicle. In addition, the rail reinforcement 200 may be connected to the crossmembers 300 to reinforce the stiffness of the side sills 100, thereby improving the stiffness of the vehicle body to improve not only the collision performance but also NVH performance.

Figure 3:
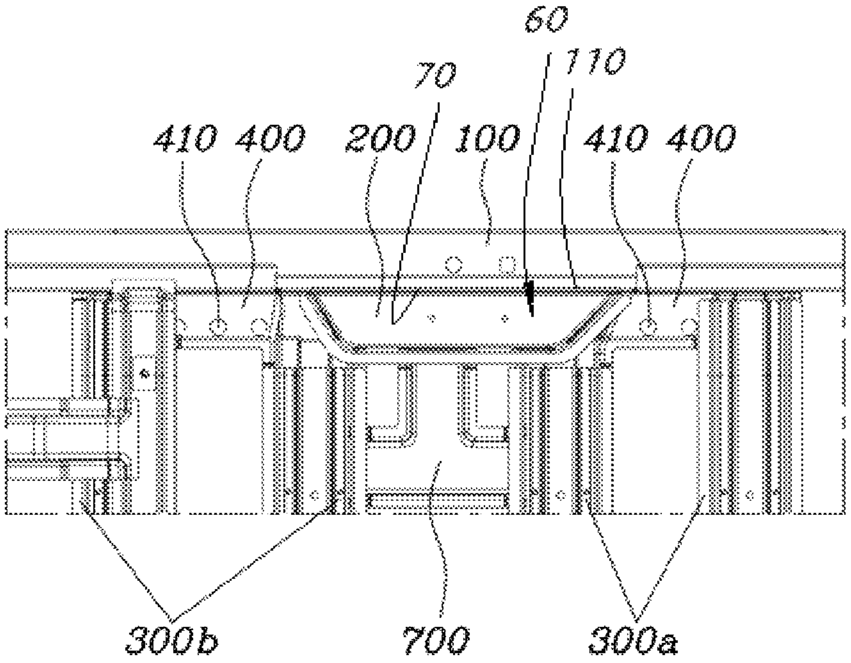
FIG. 3 is an enlarged view of a rail reinforcement portion connected to a side sill according to an embodiment of the present disclosure.

Furthermore, referring to FIGS. 1 to 3, in an embodiment of the present disclosure, a space 60 into which the rail unit 20 enters is formed between the rail reinforcement 200 and the entry hole 110, which may form a cavity or blind hole structure, and that both ends of the rail reinforcement 200 may be fixed to the inner surface 70 of the side sill 100.

The sidewall of the rail reinforcement 200 can be positioned to be spaced inward from the entry hole 110, and the front and rear ends of the sidewall can be bent toward the side sill 100 and fixed to the front and rear ends of the entry hole 110, respectively, so that a space 60 is formed between the entry hole 110 and the rail reinforcement 200, and the rail unit 20 can be positioned or placed within the space 60.

Thus, when the rail unit 20 is pushed into the vehicle due to the side collision of the vehicle, the rail reinforcement 200 can prevent the entry of the rail unit 20, thereby improving the collision performance of the vehicle.

Furthermore, a reinforcing structure 50 can be formed in a rectangular shape between the left and right side sills 100.

Figure 4:
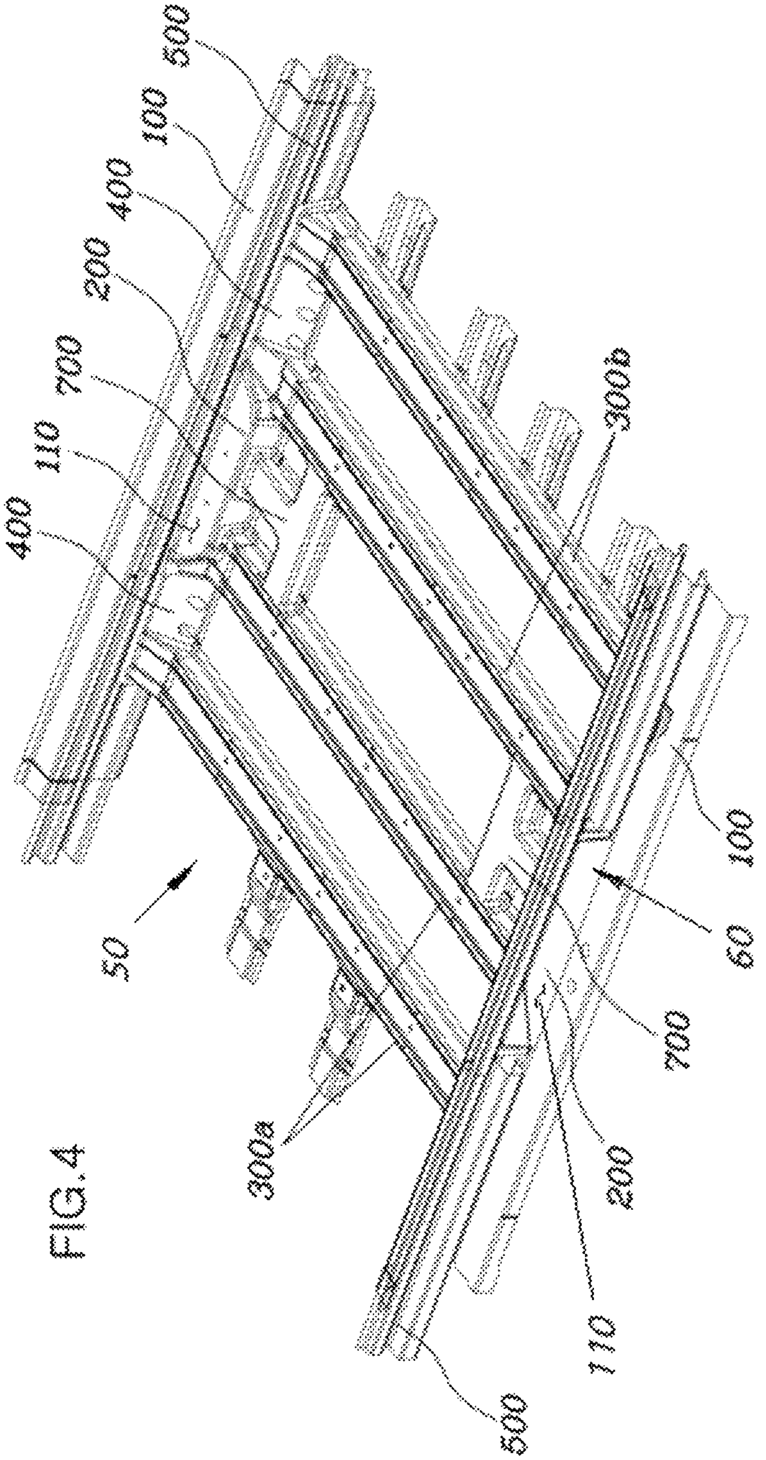
FIG. 4 is a view of the body in FIG. 2 in a three-dimensional view from the bottom according to an embodiment of the present disclosure.
Figure 5:
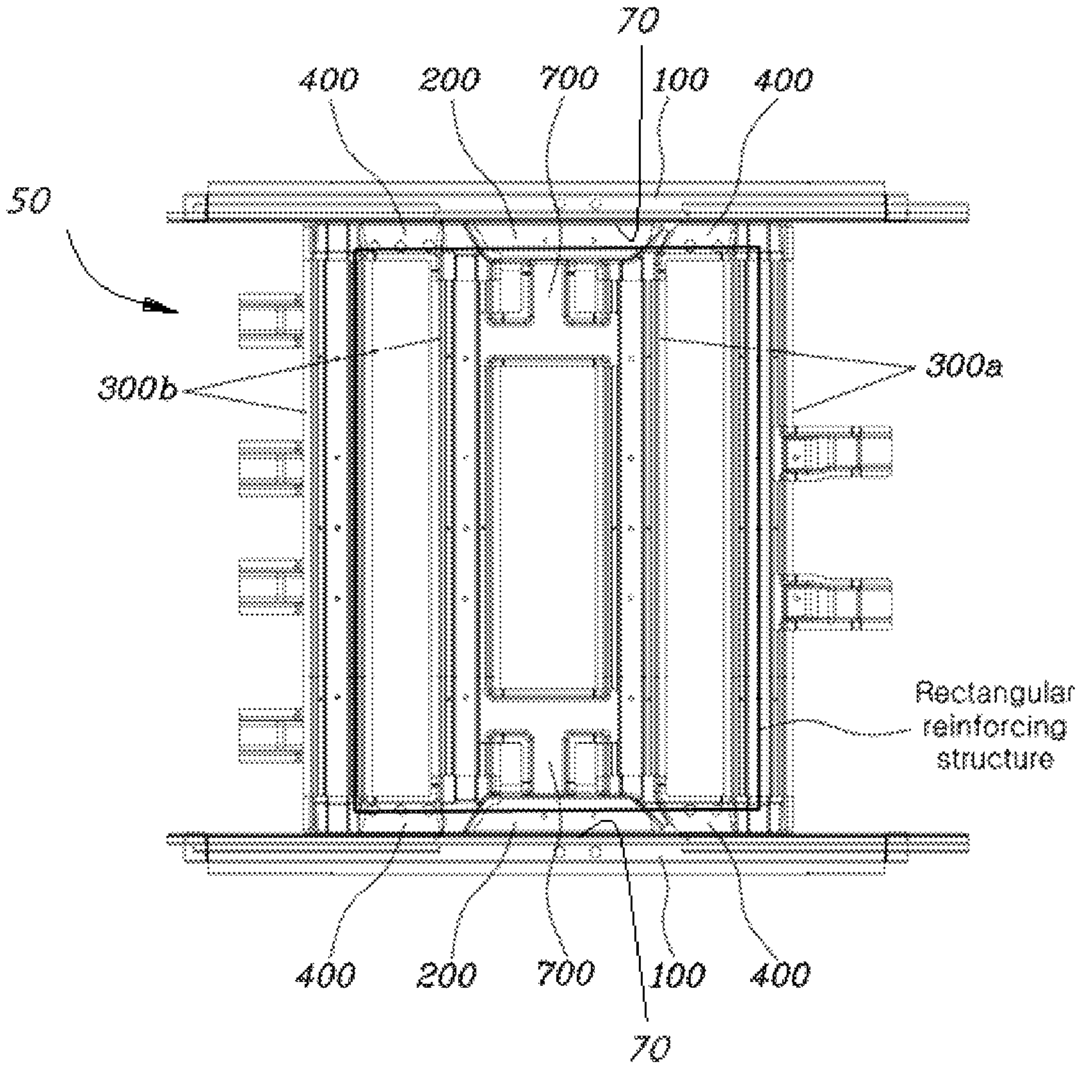
FIG. 5 is top view that illustrates the connection form of a reinforcement structure according to an embodiment of the present disclosure.

Referring to FIGS. 4 and 5, the reinforcing structure 50 may be implemented by connecting rail reinforcements 200, crossmembers 300, and crossmember extensions 400, and can include the crossmembers 300 connected between left and right sidewalls 100 at the front and rear sides of the rail reinforcements 200, respectively, and the crossmember extensions 400 can be formed toward the rail reinforcements 200 from the crossmembers 300 and can be fixed to inner surfaces 70 of the side sills 100.

Specifically, in a flat floor application, the crossmembers 300 can be formed at the bottom of the floor panel 800 in the left/right longitudinal direction, and the crossmembers 300 can be connected to the left and right sidewalls 100 in the leftward/rightward direction between the left and right sidewalls 100. The crossmembers 300 may be connected to the inner surfaces of the side sills 100 by the crossmember extensions 400, and the crossmember extensions 400 can be formed in the front/rear longitudinal direction on the inner surfaces of the side sills 100 and can be connected to the rail reinforcements 200.

Accordingly, a rectangular reinforcing structure 50 can be formed along the crossmembers 300, the crossmember extensions 400, and the rail reinforcements 200, and the reinforcement structure can be positioned between the left and right side sills 100.

Thus, in the event of a side collision, the reinforcing structure can function as a load path that transfers collision energy, transferred to a vulnerable entry hole 110 area, to the crossmembers 300 while distributing the collision energy throughout each side chamber 100, thereby improving the lateral strength of a vehicle body and significantly improving collision performance.

Furthermore, the crossmember extensions 400 may be connected to the rail reinforcements 200.

A crossmember extension 400 can be connected to the front ends of the rail reinforcements 200, and another crossmember extension 400 can be connected to the rear ends of the rail reinforcements 200, thereby forming the left and right sides of the rectangular reinforcement structure.

Further, multiple crossmembers 300 may be connected to each of the front and rear sides of each rail reinforcement 200, and the crossmember extensions 400 may be longitudinally connected to the multiple crossmembers 300.

For example, two front crossmembers 300*a* can be connected to the front side of each rail reinforcement 200, and two rear crossmembers 300*b* can be connected to the rear of each reinforcement 200.

Furthermore, the two front crossmembers 300*a* can be each longitudinally connected to crossmember extensions 400 in front of the rail reinforcements 200, and the two rear crossmembers 300*b* can be each longitudinally connected to crossmember extensions 400 behind the rail reinforcements 200.

Two crossmembers 300 may be connected to the rail reinforcements 200 while connected together to the crossmember extensions 400, thereby increasing the strength of the side sills 100 weakened by the entry holes 110.

In an embodiment of the present disclosure, side sill reinforcements 500 can be fixed to the side sills 100, and welding holes 410 for welding the side sill reinforcements 500 to the side sills 100 may be formed in each of the crossmember extensions 400.

Figure 6:
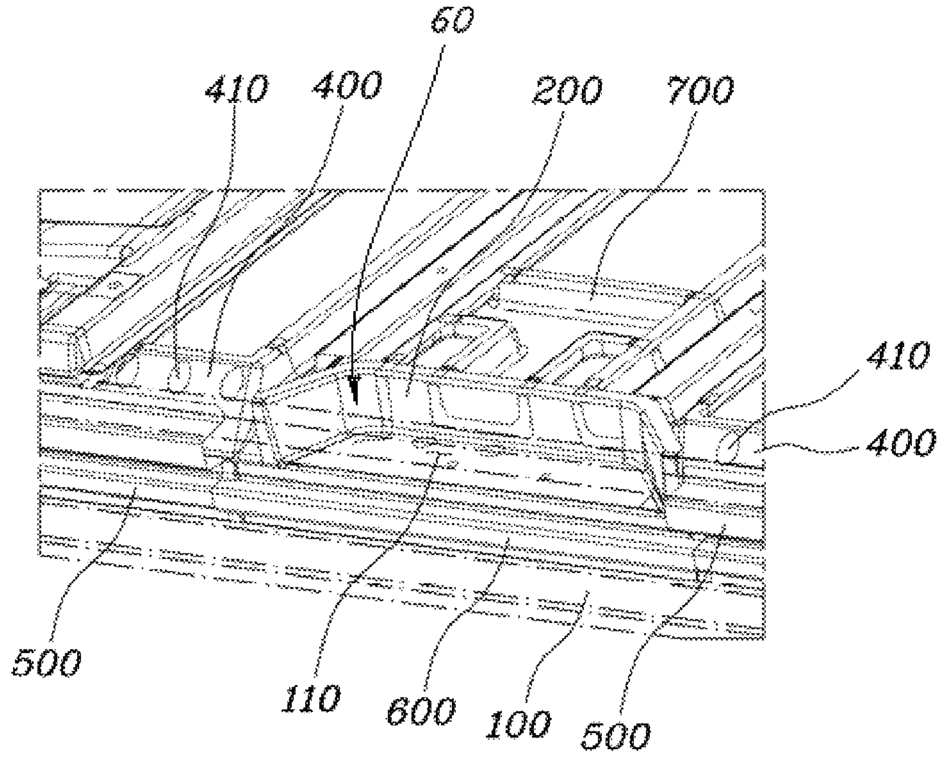
FIG. 6 is a zoomed-in perspective view that illustrates a side sill reinforcement and a connecting reinforcement fixed to a side sill according to an embodiment of the present disclosure.
Figure 7:
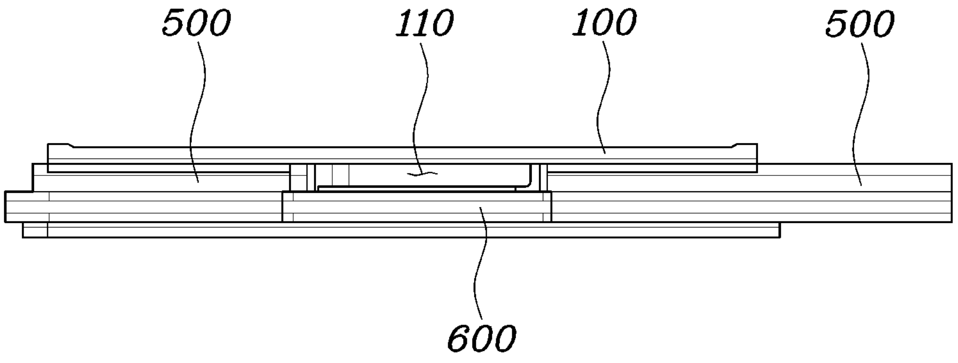
FIG. 7 is a side view that illustrates a side sill reinforcement and a connecting reinforcement fixed to a side sill according to an embodiment of the present disclosure.

Referring to FIGS. 6 and 7, the side sill reinforcements 500 can be fixed to the outer surface of a sidewall constituting each side sill 100 along the longitudinal direction of the side sill 100.

The cross-section of each of the side sill reinforcements 500 can be formed into a corrugated shape, and the cross-section of a concave portion 510 can serve as a welding flange and can be surface-attached to the side sill 100, so that the side sill reinforcement 500 can be welded to the side sill 100.

Accordingly, the welding holes 410 can be formed in each of the crossmember extensions 400 to allow welding to be performed on the weld flange.

A portion of each of the crossmember extensions 400 can be exposed between two crossmembers 300 and can be formed to slope downward toward the side sill 100, and multiple welding holes 410 can be formed in the sloping portion. The welding holes 410 can be formed in positions facing the top portion of the sidewall 100, which can be in surface-attached to the welding flange formed in each of the side sill reinforcements 500.

Thus, by performing a welding operation on the welding flange portion of each of the side sill reinforcements 500 through the welding hole 410, the side sill reinforcements 500 may be welded to the side sill 100.

Figure 8:
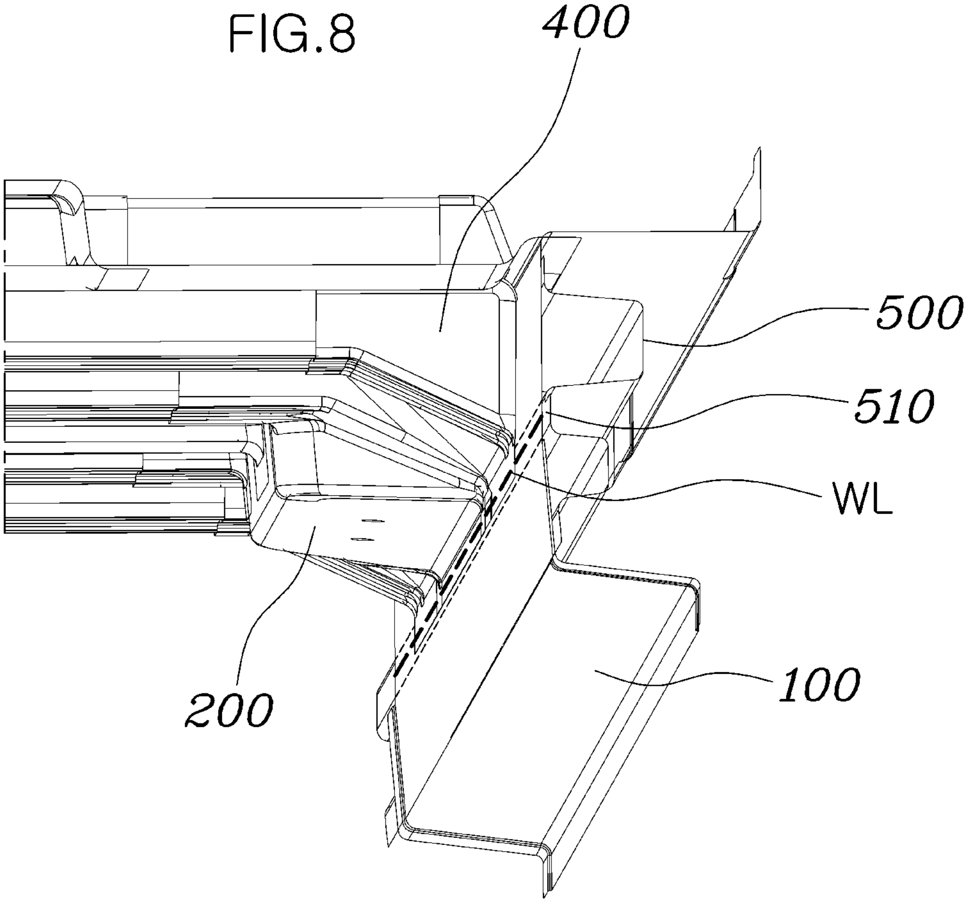
FIG. 8 is a cut-away perspective view that illustrates a configuration in which side sill reinforcing components are welded along a weld line to a side sill according to an embodiment of the present disclosure.

Referring to FIG. 8, in an embodiment of the present disclosure, the side sill reinforcement 500, the crossmember extension 400, and the rail reinforcement 200 may be welded together along a welding line WL formed in the longitudinal direction of the side sill 100.

The cross-section of a concave portion 510 can be formed in the middle of the cross-section of the side sill reinforcement 500, can serve as a welding flange, and can be surface-attached to the outer surface of the side sill 100. The lower end of the crossmember extension 400 and the lower end of the rail reinforcement 200 can be welded to the inner surface of the side sill 100 corresponding to the welding flange, so that welding lines WL thereof match each other.

The side sill reinforcement 500, the crossmember extension 400, and the rail reinforcement 200 can be welded together along the welding lines WL located along the same line, thereby improving the connectivity between the components to strengthen a collision load path.

In an embodiment of the present disclosure, the side sill reinforcements 500 can be formed with corrugated cross-sections at both ends of the entry hole 110 and may be fixed to the side sill 100.

Referring to FIGS. 6 and 7, the cross-sections of the side sill reinforcements 500 can be formed in a corrugated "W" shape, and can be fixed in front of and behind the entry hole 110, respectively, on the outer surface of the side sill 100.

Therefore, the stiffness of the side sill 100 can be enhanced by the side sill reinforcements 500 to improve lateral collision performance.

Furthermore, in the corrugated cross-section of each of the side sill reinforcements 500, the cross-section of an upper convex portion 520 may be formed larger than the cross-section of a lower convex portion 520.

In the corrugated cross-section of each of the side sill reinforcements 500, the cross-section of the upper convex portion 520 may be formed to protrude further outward from the vehicle body than the cross-section of the lower convex portion 520.

Figure 9:
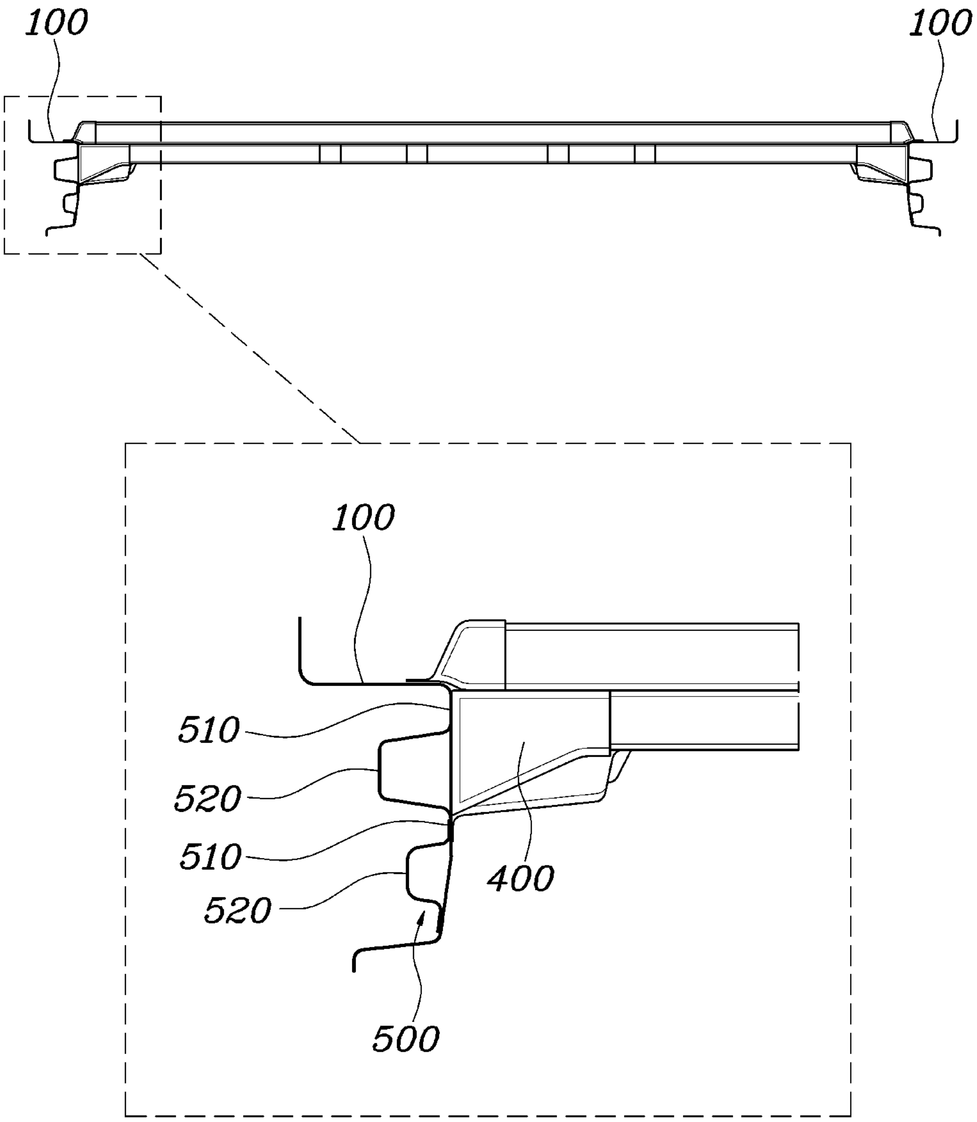
FIG. 9 is a cross-section view and a zoomed-in cross-section view that illustrate the shape of a corrugated cross-section of a side sill reinforcement according to an embodiment of the present disclosure.

Referring to FIG. 9, in the "W" cross-section shape of each side sill reinforcement 500, an upper convex portion 520 can be formed to be larger than the lower convex portion 520 while protruding further outward from the vehicle body.

Thus, in the event of a side collision, the upper convex portion 520 may collide before the lower convex portion 520 collides, thereby transmitting a collision load to the crossmember 300.

Therefore, the bottom portion of the side sill 100 may be prevented from rotating toward and entering the vehicle body.

The entry hole 110 may be formed in a part of the vertical section of a sidewall of the sidewall 100, and a connecting reinforcement 600 may be fixed in the remaining section of the sidewall of the side sill 100, in which the entry hole 110 is not formed, or extending below the entry hole 110.

Referring to FIGS. 6 and 7, the entry hole 110 may be formed in the upper section among the upper and lower sections of the side sill 100, and the connecting reinforcement 600 may be fixed to the lower section located beneath the entry hole 110. The positions of the entry hole 110 and the connecting reinforcement 600 may also be reversed.

Thus, the stiffness of the side sill 100, weakened by the entry hole 110, may be further improved.

Furthermore, the connecting reinforcement 600 may be positioned along the longitudinal direction of the side sill 100 to connect with the side sill reinforcements 500.

The connection portions of the connecting reinforcement 600 and the side sill reinforcements 500 may be shaped with cross-sections matching each other.

For example, the cross-section of the connecting reinforcement 600 can be formed with a corrugated shape that corresponds to the shape of the cross-section of each of the side sill reinforcements 500.

Thus, the connecting reinforcement 600 and the side sill reinforcements 500 can be fixed while the front and rear ends of the connecting reinforcement 600 overlap the side sill reinforcements 500 fixed in front of and behind the entry hole 110, thereby securing the connectivity between the side sill reinforcements 500 and the connecting reinforcement 600.

A support reinforcement 700 may be connected between the rail reinforcement 200 and the crossmember 300.

Referring to FIGS. 4 and 5, front and rear ends of the support reinforcement 700 may be connected between the front crossmember 300*a* and the rear crossmember 300*b*, and the side end of the support reinforcement 700 may be connected to the inner side of the rail reinforcement 200.

For example, the support reinforcement 700 can be formed in a "T" shape such that the side end thereof can be fixed to support the inner surface of the rail reinforcement 200, the front end thereof can be fixed to the front crossmember 300*a* adjacent to the rail reinforcement 200, and the rear end thereof can be fixed to the rear crossmember 300*b* adjacent to the rail reinforcement 200.

Therefore, the support reinforcement 700 can play the role of supporting the rail reinforcement 200 so that the rail unit 20 can be more effectively prevented from intruding into the vehicle body in the event of a side collision, and a collision load transmitted to the rail reinforcement 200 can be transferred to the crossmember 300 and distributed.

Furthermore, the support reinforcement 700 may be formed to have a height that corresponds to the height of the rail unit 20 which has entered the entry hole 110.

For example, the top height of the door latch part 22 may be aligned with the top height of the support reinforcement 700, and/or the vertical center portion of the door latch part 22 may be aligned with the vertical center portion of the support reinforcement 700.

Thus, in the event of a side collision, the door latch part 22 may be effectively prevented by the support reinforcement 700 from intruding into the vehicle body.

As described above, according to an embodiment of the present disclosure, in the event of a side collision of a vehicle, the rail reinforcement 200 may prevent the rail unit 20 located in the entry hole 110 from being pushed into the vehicle, thereby improving the collision performance of the vehicle. In addition, in an embodiment, the rail reinforcement 200 may be connected to the crossmember 300 to reinforce the stiffness of the side sill 100, thereby enhancing the stiffness of the vehicle body to improve not only the collision performance but also NVH performance.

Although the present disclosure has been described and illustrated in conjunction with the above particular embodiments thereof, it can be apparent to those skilled in the art that various changes and modifications may be made to the present disclosure without departing from technical ideas of the present disclosure, and such changes, equivalents, and modifications can fall within the scope of the appended claims.

What is claimed is:

1. A vehicle body comprising:

first and second side sills, wherein the first side sill has a first entry hole configured to allow a first rail unit for a first sliding door to enter a first inner side of the vehicle body;

a reinforcing structure comprising:

a first rail reinforcement protruding inward relative to the first side sill, the first rail reinforcement being shaped and configured to block the first rail unit at the first inner side of the vehicle body adjacent to the first entry hole, and members crossing the vehicle body from side to side in front of and behind the first entry hole, wherein the first rail reinforcement is connected to the members, and the reinforcing structure is configured to reinforce a first side surface of the vehicle body, wherein the members of the reinforcing structure comprise:

crossmembers connected between the first and second side sills at front and rear sides of the first rail reinforcement, respectively, and crossmember extensions extending from the crossmembers toward the first rail reinforcement and fixed to inner surfaces of the side sills; and a first side sill reinforcement fixed to the first side sill, wherein the crossmember extensions have welding holes configured to permit welding the first side sill reinforcement to the first side sill through the crossmember extensions.

2. The body of claim 1, wherein a first space is formed between the first rail reinforcement and the first entry hole, the first space being configured to receive the first rail unit therein, and wherein two ends of the first rail reinforcement are fixed to a first inner surface of the first side sill.

3. The body of claim 1, wherein the reinforcing structure is formed in a rectangular shape between the first and second side sills, wherein the first and second side sills are left and right side sills.

4. The body of claim 1, wherein the crossmember extensions are connected to the first rail reinforcement.

5. The body of claim 1, wherein multiple crossmembers are connected to each of the front and rear sides of the first rail reinforcement, and wherein the crossmember extensions are longitudinally connected to the multiple crossmembers.

6. The body of claim 1, wherein the first side sill reinforcement, the crossmember extensions, and the first rail reinforcement are welded along a first welding line formed in a longitudinal direction of the first side sill.

7. The body of claim 1, further comprising a first support reinforcement connected between the first rail reinforcement and the crossmembers.

8. The body of claim 7, wherein a front end and a rear end of the first support reinforcement are connected to a front crossmember and a rear crossmember, respectively, and a side end of the first support reinforcement is connected to an inner side of the first rail reinforcement.

9. The body of claim 7, wherein the first support reinforcement is configured to have a height corresponding to that of the first rail unit which has entered the first entry hole.

10. The body of claim 7, wherein the first support reinforcement is configured to align with the first rail unit which has entered the first entry hole.

11. The body of claim 7, wherein the first support reinforcement has a "T" shape.

12. A vehicle body comprising:

first and second side sills, wherein the first side sill has a first entry hole configured to allow a first rail unit for a first sliding door to enter a first inner side of the vehicle body, wherein the first entry hole is in an upper part of a sidewall of the first side sill;

a reinforcing structure comprising:

a first rail reinforcement protruding inward relative to the first side sill, the first rail reinforcement being shaped and configured to block the first rail unit at the first inner side of the vehicle body adjacent to the first entry hole, and members crossing the vehicle body from side to side in front of and behind the first entry hole, wherein the first rail reinforcement is connected to the members, and the reinforcing structure is configured to reinforce a first side surface of the vehicle body;

a first side sill reinforcement having a corrugated cross-section shape and is fixed to the first side sill; and a first connecting reinforcement fixed on a lower part of the sidewall of the first side sill below the first entry hole, wherein the first connecting reinforcement extends in a longitudinal direction of the first side sill and is connected to the first side sill reinforcement.

13. The body of claim 12, wherein the corrugated cross-section shape of the first side sill reinforcement has an upper convex portion adjacent to a lower convex portion, and wherein the upper convex portion is larger than the lower convex portion.

14. The body of claim 12, wherein the corrugated cross-section shape of the first side sill reinforcement has an upper convex portion adjacent to a lower convex portion, and wherein the upper convex portion protrudes further outward from the vehicle body than the lower convex portion.

15. The body of claim 12, wherein the first connecting reinforcement and the first side sill reinforcement are shaped to have cross-section portions mating with each other such that at least some portions of the first connecting reinforcement sit directly on the first side sill reinforcement.

16. The body of claim 12, wherein the first side sill reinforcement has a "W" shaped cross-section.

17. A vehicle body comprising:

first and second side sills, wherein the first side sill has a first entry hole configured to allow a first rail unit for a first sliding door to enter a first inner side of the vehicle body;

a reinforcing structure comprising:

a first rail reinforcement protruding inward relative to the first side sill, the first rail reinforcement being shaped and configured to block the first rail unit at the first inner side of the vehicle body adjacent to the first entry hole, and members crossing the vehicle body from side to side in front of and behind the first entry hole, wherein the first rail reinforcement is connected to the members, and the reinforcing structure is configured to reinforce a first side surface of the vehicle body, wherein the members of the reinforcing structure comprise:

crossmembers connected between the first and second side sills at front and rear sides of the first rail reinforcement, respectively, and crossmember extensions extending from the crossmembers toward the first rail reinforcement and fixed to inner surfaces of the side sills; and a first support reinforcement connected between the first rail reinforcement and the crossmembers, wherein the first support reinforcement has a "T" shape.

18. The body of claim 17, wherein a first space is formed between the first rail reinforcement and the first entry hole, the first space being configured to receive the first rail unit therein, and wherein two ends of the first rail reinforcement are fixed to a first inner surface of the first side sill.

19. The body of claim 17, further comprising a first side sill reinforcement having a corrugated cross-section shape and fixed to the first side sill.

20. The body of claim 19, wherein the first entry hole is in an upper part of a sidewall of the first side sill;

wherein the vehicle body further comprises a first connecting reinforcement fixed on a lower part of the sidewall of the first side sill below the first entry hole, wherein the first connecting reinforcement extends in a longitudinal direction of the first side sill and is connected to the first side sill reinforcement; and wherein the first connecting reinforcement and the first side sill reinforcement are shaped to have cross-section portions mating with each other such that at least some portions of the first connecting reinforcement sit directly on the first side sill reinforcement.

* * * * *